US010061162B2

(12) United States Patent
Park

(10) Patent No.: US 10,061,162 B2
(45) Date of Patent: Aug. 28, 2018

(54) METHOD FOR FABRICATING THE LIQUID CRYSTAL DISPLAY DEVICE HAVING A SEAL INSERTION GROOVE AND A PLURALITY OF ANTI-SPREADING GROOVES

(71) Applicant: LG DISPLAY CO., LTD., Seoul (KR)

(72) Inventor: MunGi Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 11 days.

(21) Appl. No.: 15/481,667

(22) Filed: Apr. 7, 2017

(65) Prior Publication Data
US 2017/0212372 A1 Jul. 27, 2017

Related U.S. Application Data

(62) Division of application No. 14/075,038, filed on Nov. 8, 2013, now Pat. No. 9,651,829.

(30) Foreign Application Priority Data

Dec. 26, 2012 (KR) .................. 10-2012-0153659

(51) Int. Cl.
G02F 1/1339 (2006.01)
G02F 1/1333 (2006.01)
(Continued)

(52) U.S. Cl.
CPC .......... G02F 1/1339 (2013.01); G02F 1/1362 (2013.01); G02F 1/1368 (2013.01);
(Continued)

(58) Field of Classification Search
CPC combination set(s) only.
See application file for complete search history.

(56) References Cited

U.S. PATENT DOCUMENTS 6,057,898 A    5/2000  Itoh et al.
6,654,084 B1  11/2003  Marukawa et al.
(Continued)

FOREIGN PATENT DOCUMENTS

CN   1355896 A   6/2002
CN   1356586 A   7/2002
(Continued)

OTHER PUBLICATIONS

Office Action dated Nov. 23, 2016 from the German Patent and Trademark Office in counterpart German application No. 102013111753.8.
(Continued)

Primary Examiner — Lauren Nguyen
(74) Attorney, Agent, or Firm — Morgan, Lewis & Bockius LLP

(57) ABSTRACT

The present disclosure relates to a liquid crystal display device and a fabricating method thereof. The device includes a thin film transistor formed on a lower substrate, a pixel electrode formed on the lower substrate, a planarization layer formed on an entire surface of the lower substrate, a black matrix formed on the upper substrate, a color filter layer formed on a upper substrate, partition walls formed on the upper substrate and forming a space corresponding to a seal pattern insertion groove, a liquid crystal layer interposed between the lower substrate and the upper substrate, and a seal pattern inserted between the seal pattern insertion groove located on the non-display region of the lower substrate and the upper substrate and the partition walls.

12 Claims, 8 Drawing Sheets

(51) Int. Cl.
*G02F 1/1362* (2006.01)
*G02F 1/1335* (2006.01)
*G02F 1/1343* (2006.01)
*G02F 1/1368* (2006.01)
*G02F 1/1337* (2006.01)

(52) U.S. Cl.
CPC ...... *G02F 1/13394* (2013.01); *G02F 1/13439* (2013.01); *G02F 1/133345* (2013.01); *G02F 1/133512* (2013.01); *G02F 1/133516* (2013.01); *G02F 1/136286* (2013.01); *G02F 1/1337* (2013.01); *G02F 2001/133357* (2013.01); *G02F 2001/134372* (2013.01); *G02F 2201/123* (2013.01)

(56) References Cited

U.S. PATENT DOCUMENTS

| | | | |
|---|---|---|---|
| 2002/0063840 | A1 | 5/2002 | Chun et al. |
| 2005/0073638 | A1 | 4/2005 | Byun |
| 2005/0270452 | A1* | 12/2005 | Ahn ................. G02F 1/133555 349/114 |
| 2007/0146618 | A1 | 6/2007 | Hashimoto |
| 2008/0129946 | A1 | 6/2008 | Chan |
| 2010/0149477 | A1* | 6/2010 | Nagami ................ G02F 1/1339 349/138 |
| 2013/0250227 | A1 | 9/2013 | Kira et al. |
| 2014/0016070 | A1 | 1/2014 | Choi et al. |

FOREIGN PATENT DOCUMENTS

| | | |
|---|---|---|
| CN | 1991531 A | 7/2007 |
| CN | 102262319 A | 11/2011 |
| CN | 202472188 U | 10/2012 |
| DE | 19951686 A1 | 5/2000 |
| EP | 2687901 A1 | 1/2014 |
| EP | 2813885 A2 | 12/2014 |
| JP | 2003066465 A | 3/2003 |
| TW | 200634412 A | 10/2006 |
| TW | I269920 B | 1/2007 |
| TW | I322315 B | 3/2010 |
| WO | 2012074010 A1 | 6/2012 |

OTHER PUBLICATIONS

Office Action issued in corresponding Taiwanese Patent Application No. 102142627 dated Jun. 4, 2015.

First Notification of Office Action dated Dec. 24, 2015 from The State Intellectual Property Office of China in counterpart Chinese application No. 201310606699.1.

* cited by examiner

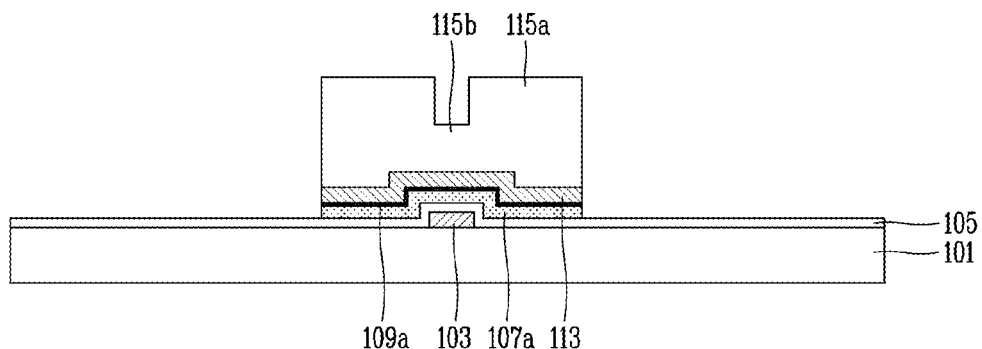
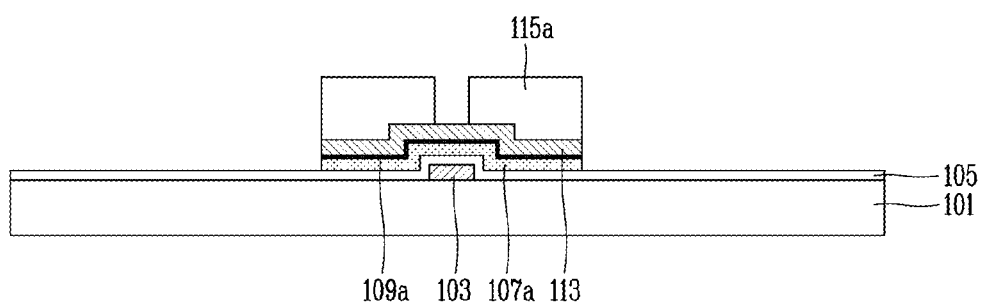
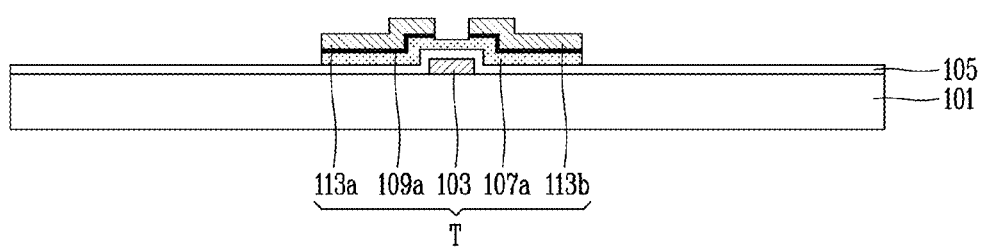
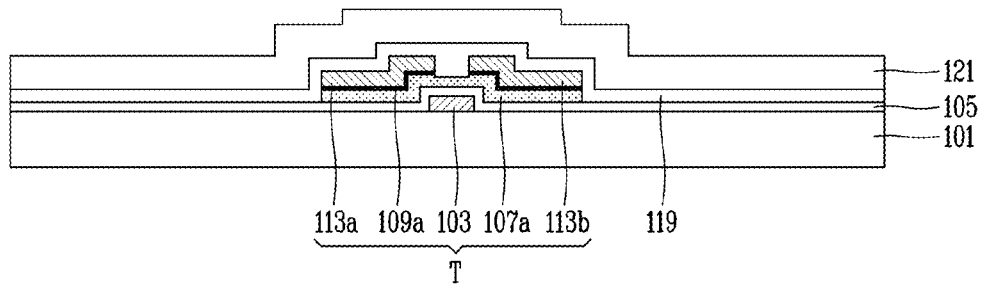

METHOD FOR FABRICATING THE LIQUID CRYSTAL DISPLAY DEVICE HAVING A SEAL INSERTION GROOVE AND A PLURALITY OF ANTI-SPREADING GROOVES

CROSS-REFERENCE TO RELATED APPLICATION

This application is a divisional of U.S. patent application Ser. No. 14/075,038, filed on Nov. 8, 2013, and also claims the benefit of Korean Patent Application No. 10-2012-0153659, filed on Dec. 26, 2012, both of which are hereby incorporated by reference.

BACKGROUND OF THE DISCLOSURE

1. Field of the Disclosure

This specification relates to a liquid crystal display (LCD) device, and particularly, to an LCD device and a fabricating method thereof.

2. Background of the Disclosure

In general, liquid crystal display (LCD) devices utilize properties of liquid crystals, such as optical anisotropy and polarity. Since the liquid crystal molecules have a long thin structure and an alignment orientation, alignment of the liquid crystal molecules can be controlled by artificial application of an electric field to the liquid crystals.

Accordingly, when the alignment orientation of the liquid crystal molecules is randomly adjusted, light is refracted toward the alignment orientation of the liquid crystal molecules due to the optical anisotropy, thereby displaying image information.

Currently, active matrix liquid crystal display (AM-LCD) devices, which have thin film transistors and pixel electrodes arranged in a matrix configuration, are being developed to have high resolution and an ability to display moving images.

The LCD device includes a color filter substrate (i.e., upper substrate) having common electrodes, an array substrate (i.e., lower substrate) having pixel electrodes, and a liquid crystal interposed between the upper and lower substrates. The common electrode and the pixel electrodes of the LCD device drive the liquid crystal molecules by an electric field formed in an up-and-down direction. Accordingly, the LCD device has high transmittance and large aperture ratio. But the LCD device has a low viewing angle characteristic due to the liquid crystal molecules being driven by the vertically formed electric field.

Therefore, to overcome the drawback, a new technology such as a liquid crystal driving method by fringe field switching (FFS) has been proposed. The liquid crystal driving method using the FFS exhibits a high viewing angle characteristic.

Hereinafter, the related art FFS mode LCD device having the advantage will be described with reference to FIG. 1.

FIG. 1 is a schematic planar view of an FFS mode LCD device according to the related art.

The FFS mode LCD device according to the related art, as shown in FIG. 1, includes a lower substrate 11 and an upper substrate 41 bonded to each other and having a display region AA and a non-display region NA defined thereon, respectively, and a liquid crystal layer 61 interposed between the lower substrate 11 and the upper substrate 41.

Here, the lower substrate 11 includes a plurality of gate lines (not shown) extending in one direction and spaced from one another in parallel, a gate electrode 13 perpendicularly extending from each gate line (not shown), a plurality of data lines (not shown) intersecting with the gate lines (not shown) to define pixel regions on intersections, respectively, and a thin film transistor (TFT) "T" disposed on each intersection between the gate line and the data line and having the gate electrode 13, an active layer 17 and source and drain electrodes 21 and 23. Here, although not shown, a gate pad (not shown) and a data pad (not shown) extend from one end of the gate line and one end of the data line, respectively. The gate pad and the data pad are connected to a gate pad connection line (not shown) and a data pad connection line (not shown).

Also, the lower substrate 11 further includes a pixel electrode 27 having a large area and electrically connected to the TFT T. An organic planarization layer 29 is formed on the lower substrate 11 having the pixel electrode 27. Here, the pixel electrode 27 is electrically connected to the drain electrode 23 forming the TFT T.

A plurality of common electrodes 31 corresponding to the pixel electrodes 27 are formed on the organic planarization layer 29. A lower alignment layer 33 is formed on the organic planarization layer 29 including the plurality of common electrodes 31.

Meanwhile, a black matrix 43 is formed between adjacent pixel regions (not shown) including the non-display region NA of the upper substrate 41, and a color filter layer 45 is formed on each pixel region (not shown).

An upper alignment layer 47 is formed on an entire surface of the upper substrate 41 including the color filter layer 45.

A seal pattern 51 is formed on outer edges of the non-display region NA to bond the lower substrate 11 and the upper substrate 41 to each other.

With the configuration, when a data signal is applied to the pixel electrode 27 via the TFT T, a fringe field is formed between the common electrodes 31 with a common voltage supplied thereto and the pixel electrodes 27 such that the liquid crystal molecules aligned in a horizontal direction between the lower substrate 11 and the upper substrate 41 are rotated by dielectric anisotropy. Also, a rotation level of the liquid crystal molecules decides transmittance of light transmitted through the pixel regions, thereby realizing gradation.

FIG. 2 is a schematic view showing a state that the seal pattern is spread in outer and inner directions of the non-display region upon bonding the upper and lower substrates of the related art LCD device.

In the related art FFS mode LCD device, as shown in FIG. 2, the seal pattern 51 is interposed between the lower substrate 11 and the upper substrate 41 to bond the upper and lower substrates 11 and 41 to each other. The seal pattern 51 is spread out in an outer direction of the non-display region NA by a first width W1 and in an inner direction of the non-display region NA by a second width W2.

Accordingly, taking into account a spreading tolerance (difference) of the width of the seal pattern and a spreading tolerance of the alignment layer, the related art LCD device has to ensure a distance from the seal pattern 51 to an end of the substrate by a predetermined distance, for example, over 0.2 mm. This is to prevent a defect of non-separation of a cell upon cell scribing due to the spreading of the seal pattern 51.

Also, in the related art, as the seal pattern 51 is spread out in the related art, the lower alignment layer 33 and the upper alignment layer 47 are also spread out of their areas to overlap the seal pattern 51. This causes a problem of lowering a bonding force.

As described above, it is difficult in the related art FFS LCD device to control the spreading of the seal pattern formed on the non-display region NA and the spreading of the alignment layer.

Also, it is likely to cause a defect that a cell is not separated during a cell scribing process when a margin is low due to the spreading of the seal pattern.

In addition, in the related art, due to the spreading of the seal pattern, the lower alignment layer and the upper alignment layer are also spread out of their areas to overlap the seal pattern 51, which causes a problem of lowering a bonding force.

SUMMARY OF THE DISCLOSURE

Therefore, to overcome those drawbacks of the related art, an aspect of the detailed description is to provide a liquid crystal display (LCD) device, capable of realizing a fine seal pattern by preventing spreading of a seal pattern and alignment layers and reducing a margin for a spread width of the seal pattern, in a manner of forming a seal pattern insertion groove on a non-display region of a lower substrate and forming partition walls for fixing the seal pattern on an upper substrate upon fabricating an FFS mode LCD device, and a fabricating method thereof.

To achieve these and other advantages and in accordance with the purpose of this specification, as embodied and broadly described herein, there is provided a liquid crystal display device including a lower substrate and an upper substrate bonded to each other and having a display region and a non-display region defined thereon, a gate line formed on the lower substrate in one direction and a data line intersecting with the gate line to define a pixel region, a thin film transistor formed on the intersection between the gate line and the data line, a pixel electrode formed on the pixel region of the lower substrate, and electrically connected to the thin film transistor, a planarization layer having a seal pattern insertion groove formed on the non-display region of the lower substrate having the pixel electrode and the thin film transistors, a black matrix formed on the upper substrate, a color filter layer formed on the upper substrate between the adjacent black matrixes, partition walls formed on the upper substrate and forming a space corresponding to the seal pattern insertion groove formed on the lower substrate, a column spacer to maintain a cell gap between the upper substrate and the lower substrate, a liquid crystal layer interposed between the lower substrate and the upper substrate, and a seal pattern inserted between the seal pattern insertion groove and the partition walls located on the non-display region of the lower substrate and the upper substrate.

To achieve these and other advantages and in accordance with the purpose of this specification, as embodied and broadly described herein, there is provided a method of fabricating a liquid crystal display device including providing a lower substrate and an upper substrate having a display region and a non-display region defined thereon, forming a gate line on the lower substrate in one direction and a data line intersecting with the gate line to define a pixel region, respectively, forming a thin film transistor on the intersection between the gate line and the data line, forming a pixel electrode on the pixel region of the lower substrate to be electrically connected to the thin film transistor, forming a planarization layer having a seal pattern insertion groove on the non-display region of the lower substrate having the pixel electrode and the thin film transistor, forming a black matrix on the upper substrate, forming a color filter layer on the upper substrate between the adjacent black matrixes, forming partition walls and a column spacer on the upper substrate, the partition walls forming a space corresponding to the seal pattern insertion groove formed on the lower substrate, forming a seal pattern between the seal pattern insertion groove of the lower substrate and the partition walls, and forming a liquid crystal layer between the lower substrate and the upper substrate.

According to the present disclosure disclosed herein, an LCD device according to the present disclosure may include a seal pattern insertion groove on an edge portion of a planarization layer located on a non-display region of a lower substrate, and partition walls formed on an upper substrate to define a space corresponding to the seal pattern insertion groove. This may allow the seal pattern to be fixed with being inserted in the seal pattern insertion groove and the space formed by the partition walls, resulting in reducing a margin for a spread width of the seal pattern and preventing the seal pattern or an alignment layer from being spread out of a cell.

Also, according to the LCD device and the fabricating method thereof according to the present disclosure, with further forming a plurality of anti-spreading grooves on the planarization layer at an outer side of the lower substrate adjacent to the seal pattern insertion groove, outward spreading of a part of the seal pattern or the alignment layer can be fully prevented.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of a fringe field switching (FFS) mode LCD device according to the exemplary embodiments, with reference to the accompanying drawings. For the sake of brief description with reference to the drawings, the same or equivalent components will be provided with the same reference numbers, and description thereof will not be repeated.

Figure 1:
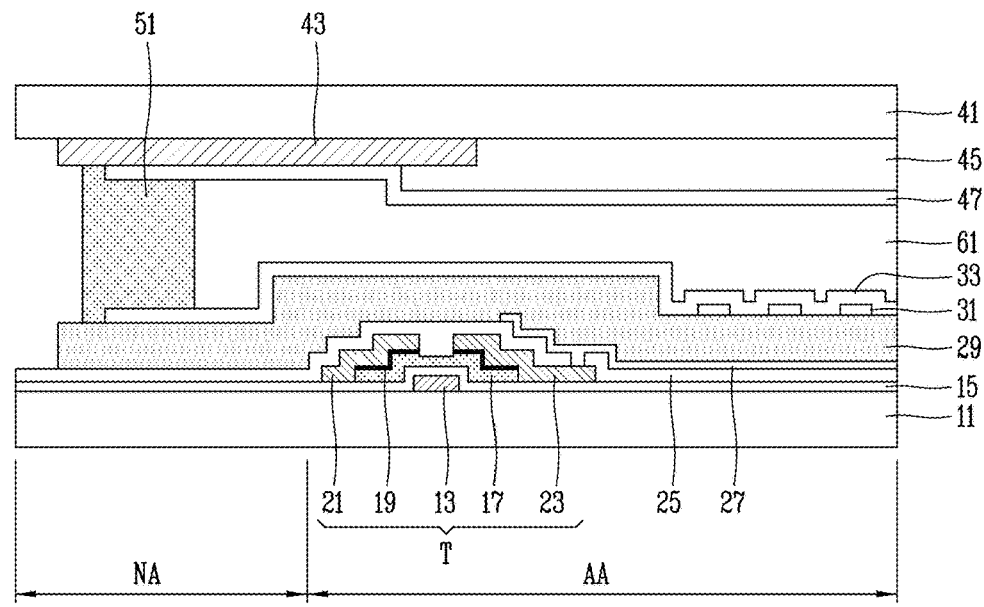
FIG. 1 is a planar view schematically showing an FFS mode LCD device according to the related art.
Figure 2:
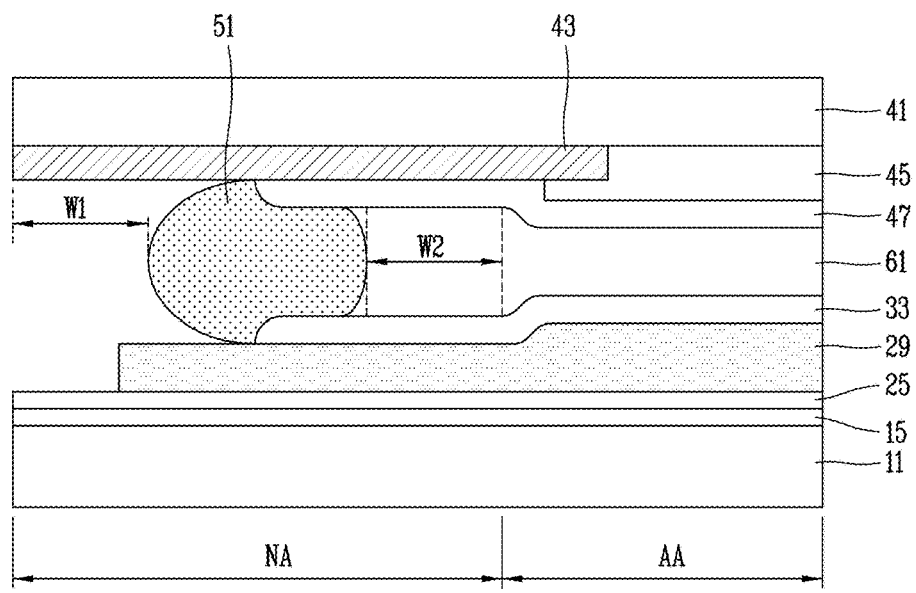
FIG. 2 is a schematic view showing a state that a seal pattern is spread in outer and inner directions of a non-display region upon bonding upper and lower substrates of the related art FFS mode LCD device.
Figure 3:
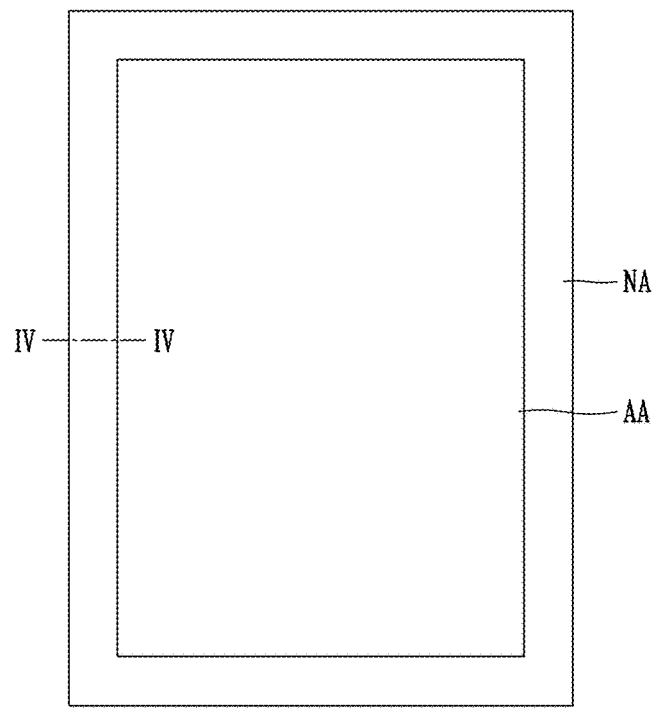
FIG. 3 is a planar view schematically showing an FFS mode LCD device in accordance with an exemplary embodiment of the present disclosure.
Figure 4:
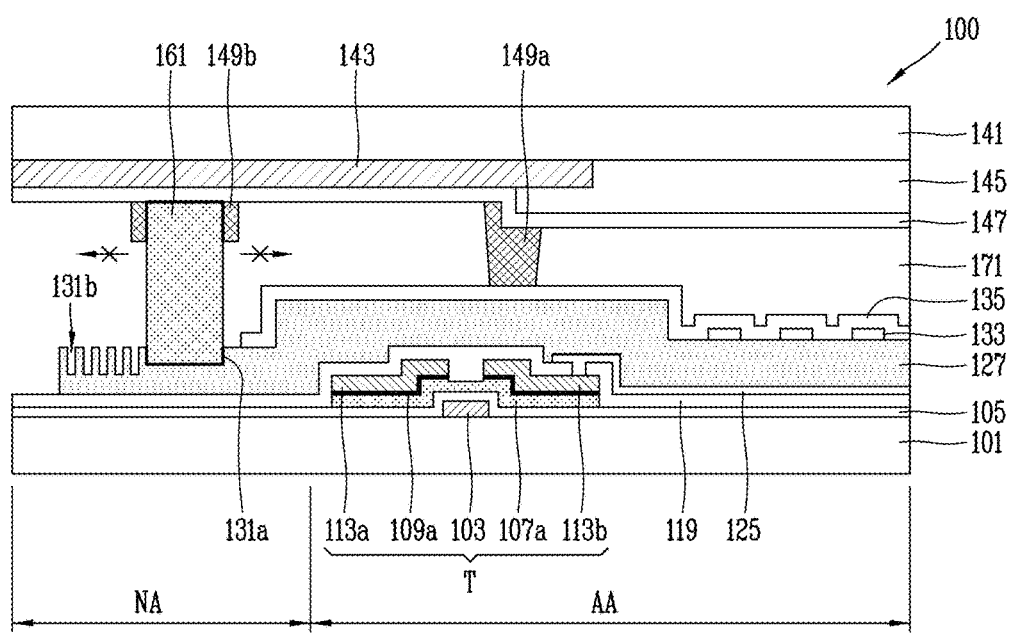
FIG. 4 is a sectional view schematically showing the FFS mode LCD device in accordance with the present disclosure.

FIG. 3 is a planar view schematically showing an FFS mode LCD device in accordance with an exemplary embodiment of the present disclosure, and FIG. 4 is a sectional view schematically showing the FFS mode LCD device in accordance with the present disclosure.

The present disclosure exemplarily illustrates an FFS mode LCD device, but may not be limited to the type. It should be understood that the present disclosure can also be applied to LCD devices and other display devices using different driving methods including an in-plane switching (IPS) mode and a twisted nematic (TN) mode.

An FFS mode LCD device 100 according to the present disclosure, as shown in FIG. 4, may include a lower substrate 101 and an upper substrate 141 having transparency and insulation characteristics, a seal pattern 161 formed on outer edges of the substrates 101 and 141 to bond the lower and upper substrates 101 and 141 to each other, and a liquid crystal layer 171 filled in a space (gap) formed between the bonded substrates 101 and 141.

The seal pattern 161 may be disposed on a non-display region NA which is formed as the lower substrate 101 and the upper substrate 141 are bonded to each other, and the liquid crystal layer 171 may be disposed on a display region AA which is formed as the lower substrate 101 and the upper substrate 141 are bonded to each other.

Hereinafter, the FFS mode LCD device 100 according to the present disclosure will be described in more detail.

Referring to FIG. 4, the display region AA and the non-display region NA may be defined on the lower substrate 101 and the upper substrate 141 bonded to each other.

The lower substrate 101 may include gate lines (not shown) formed in one direction, date lines (not shown) defining pixel regions by intersecting with the gate lines, and a TFT T formed on each intersection between the gate lines and the data lines. Here, the TFT T may include a gate electrode 103 perpendicularly extending from the gate line (not shown) on the lower substrate 101, a gate insulating layer 105 on the gate electrode 103, an active layer pattern 107a, and a source electrode 113a and a drain electrode 113b spaced apart from each other, together with an Ohmic contact layer pattern 109a, by a channel region of the active layer pattern 107a.

A large-scale pixel electrode 125 which is electrically connected to the TFT T may be formed on each pixel region of the lower substrate 101. The large pixel electrode 125 may be disposed on an entire surface of the pixel region of the lower substrate 101, namely, a TFT substrate, with a gap spaced from the gate line and the data line.

Figure 5:
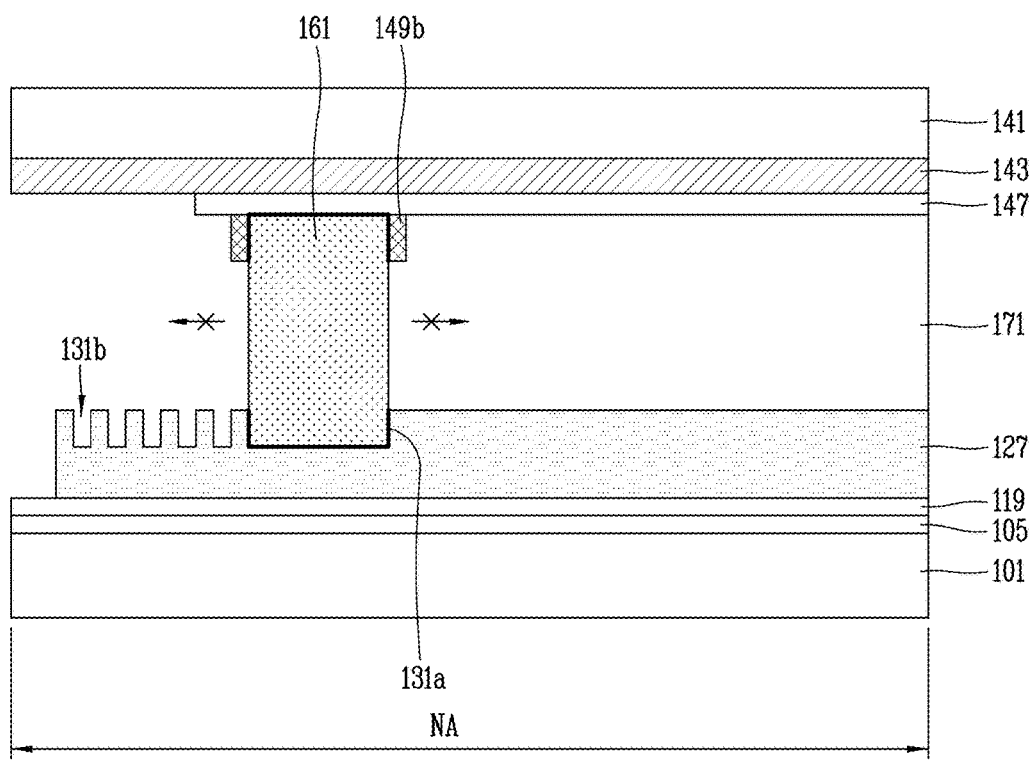
FIG. 5 is an enlarged view schematically showing a state that a seal pattern is not spread out of a cell by a seal pattern insertion groove and partition walls upon boding a lower substrate and an upper substrate of the FFS mode LCD device.

FIG. 5 is an enlarged view schematically showing a state that a seal pattern is not spread out of a cell by a seal pattern insertion groove and partition walls upon boding the lower substrate and the upper substrate of the FFS mode LCD device.

Referring to FIG. 5, a seal pattern insertion groove 131a in which a seal pattern 161 is inserted may be formed on a portion of a planarization layer 127, which is located on the non-display region NA of the lower substrate 101. An anti-spreading groove 131b may be formed on the planarization layer 127, adjacent to the seal pattern insertion groove 131a. Here, the anti-spreading groove 131b may be smaller than the seal pattern insertion groove 131a. The anti-spreading groove 131b may be provided in plurality. The seal pattern insertion groove 131a and the anti-spreading grooves 131b may also be formed on a passivation layer 119 other than the planarization layer 127.

Accordingly, with the seal pattern 161 being fixed by being inserted in the seal pattern insertion groove 131a, the seal pattern 161 may be primarily prevented from being spread to outer and inner sides of the non-display region NA. Also, the plurality of anti-spreading grooves 131b may function to secondarily prevent the seal pattern 161 or a lower alignment layer 135 from being spread to the outer side of the non-display region NA.

A plurality of diverged common electrodes 133 which overlap the pixel electrodes 125 may be formed on the planarization layer 127. The lower alignment layer 135 may be formed on the planarization layer 127 including the common electrodes 133. Here, the diverged common electrodes 133 may be spaced apart from one another by predetermined gaps with interposing the planarization layer 127 therebetween. The common electrodes 133 may overlap the large pixel electrodes 125 disposed on the pixel regions. The common electrodes 133 may also overlap the data lines.

Accordingly, a reference voltage, namely, a common voltage for driving liquid crystal molecules may be applied to each pixel through the plurality of common electrodes 133. The common electrode 133 may overlap the large pixel electrode 125 on each pixel region, with interposing the planarization layer 127 therebetween, thereby generating a fringe field.

A black matrix 143 may be formed on the upper substrate 141. A color filter layer 145 may be formed on the upper substrate 141 between the adjacent black matrixes 143. Here, the black matrix 143 may prevent transmission of light into an area except for the pixel region.

The color filter layer 145 may include red, green and blue color filter layers. The black matrix 143 may be disposed on the upper substrate 141 between the red, green and blue color filter layers 145.

Here, upon bonding the upper substrate 141 and the lower substrate 101 to each other, the black matrix 143 may be disposed on the upper substrate 141 to overlap an area except for the pixel region of the lower substrate 101, for example, the non-display region NA, the TFT T, the gate line and the data line.

The upper substrate 141 having the color filter layer 145 may include an upper alignment layer 147. On the upper alignment layer 147 of the upper substrate 141 may be formed a column spacer 149a for maintaining a cell gap with the lower substrate 101, and partition walls 149b having a space corresponding to the seal pattern insertion groove 131a formed on the lower substrate 101. Here, the partition wall 149b may be provided as a pair on inner and outer sides, and the seal pattern 161 may be inserted between the inner and outer partition walls 149b. The partition walls 149b may be greater in size than the seal pattern insertion groove 131a.

Specifically, the partition walls 149a may include a first partition wall and a second partition wall, and be formed on the non-display region NA. The first partition wall may be located between the outermost portion of the non-display area NA and the seal pattern 161, and the second seal pattern 161 may be located between the seal pattern 161 and the column spacer 149a. A gap between the first partition wall and the second partition wall may be the same as a width of the seal pattern insertion groove 131a.

The column spacer 149a for maintaining the cell gap may be formed between the upper substrate 141 and the lower substrate 101. The seal pattern 161 may be located between the seal pattern insertion groove 131a and the partition walls 149b, located on the non-display regions NA of the lower substrate 101 and the upper substrate 141.

The liquid crystal layer 171 may be disposed between the lower substrate 101 and the upper substrate 141.

With the configuration, when a data signal is applied to the pixel electrode 125 through the TFT T, a fringe field may be formed between the common electrode to which a common voltage has been supplied and the pixel electrode 125. Accordingly, liquid crystal molecules, which are horizontally arranged between the lower substrate 101 and the upper substrate 141, may be rotated by dielectric anisotropy. A rotation level of the liquid crystal molecules may decide transmittance of light transmitted through the pixel region, thereby realizing gradation.

Therefore, an LCD device according to the present disclosure may include a seal pattern insertion groove on an edge portion of a planarization layer located on a non-display region of a lower substrate, and partition walls formed on an upper substrate to define a space corresponding to the seal pattern insertion groove. This may allow the seal pattern to be fixed with being inserted in the seal pattern insertion groove and the space formed by the partition walls, resulting in reducing a margin for a spread width of the seal pattern and preventing the seal pattern or an alignment layer from being spread out of a cell.

Also, according to the LCD device and the fabricating method thereof according to the present disclosure, with further forming a plurality of anti-spreading grooves on the planarization layer at an outer side of the lower substrate adjacent to the seal pattern insertion groove, outward spreading of a part of the seal pattern or the alignment layer can be fully prevented.

Hereinafter, description will be given of a method of fabricating the FFS mode LCD device having the configuration, with reference to FIGS. 6A to 6R.

Figure 6A:
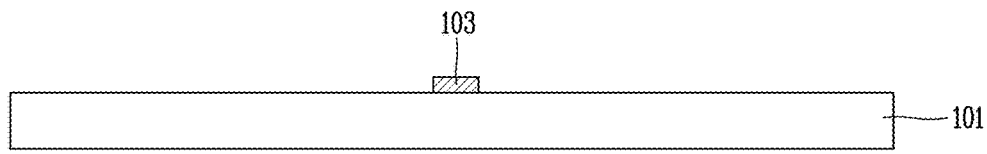
FIGS. 6A to 6R are sectional views sequentially showing a fabricating process of an FFS mode LCD device in accordance with an exemplary embodiment of the present disclosure.
Figure 6B:
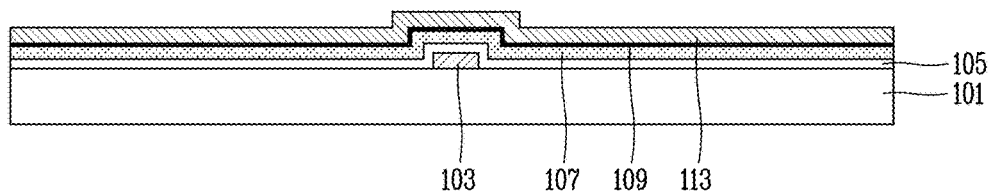
Figure 6C:
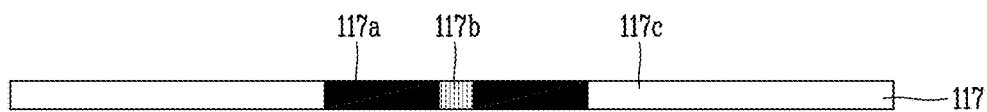
Figure 6C:
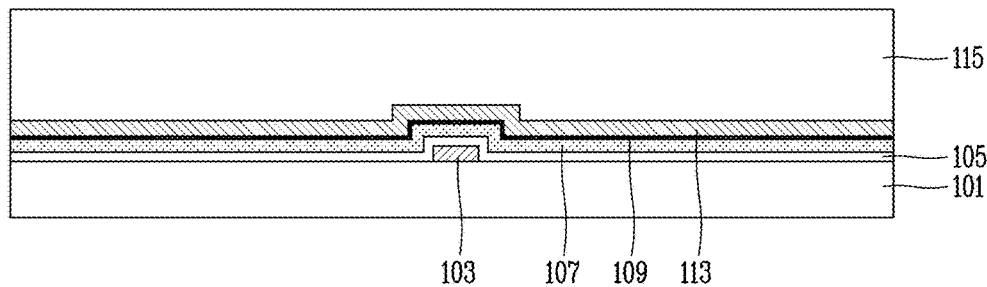
Figure 6D:
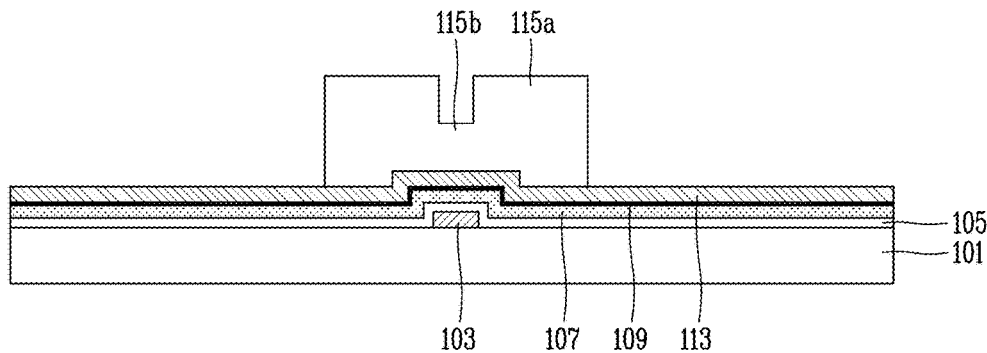
Figure 6I:
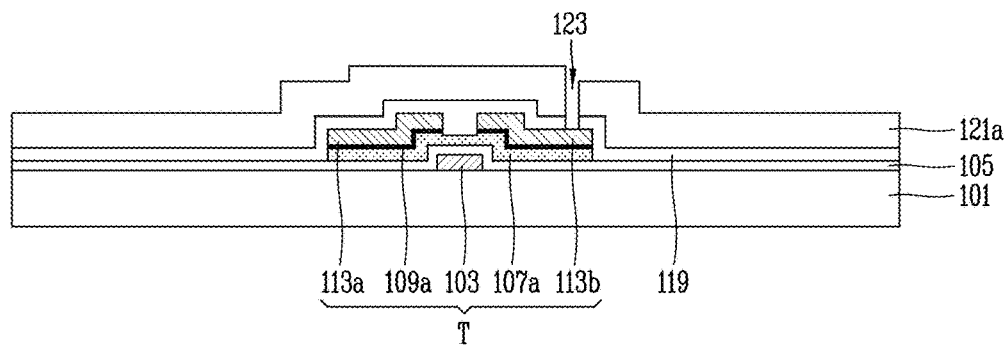
Figure 6J:
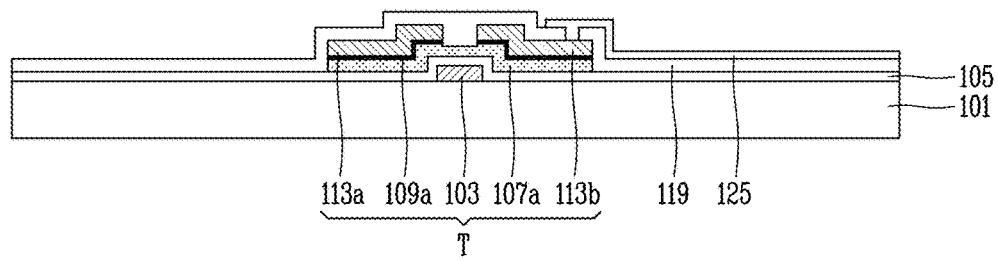
Figure 6K:
Figure 6K:
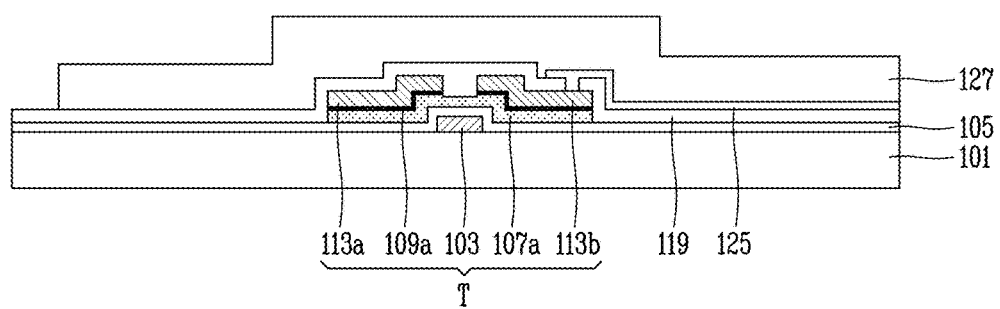
Figure 6L:
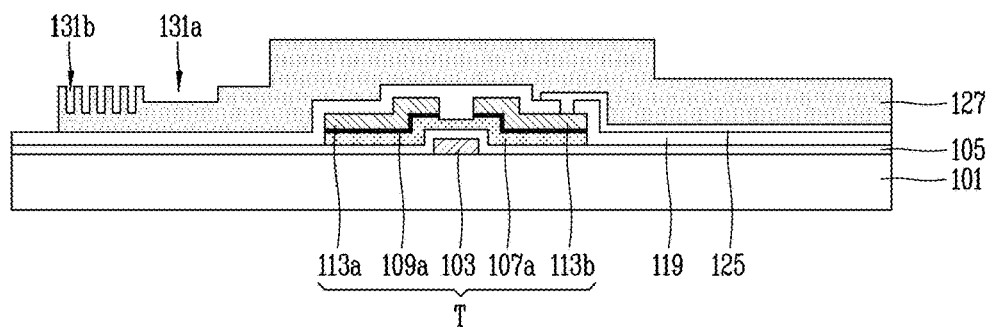
Figure 6M:
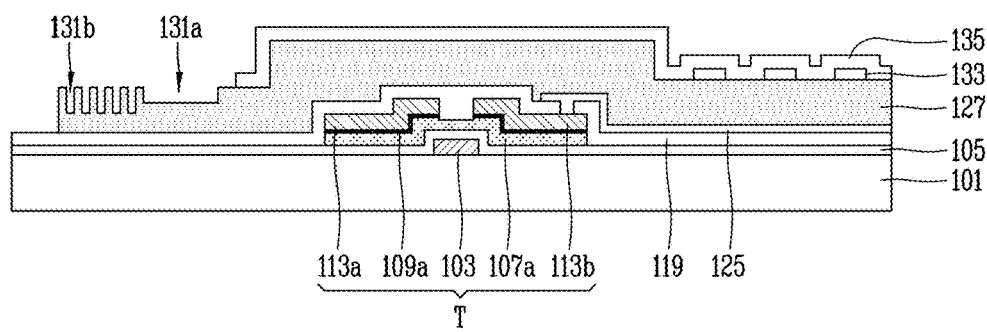
Figure 6N:
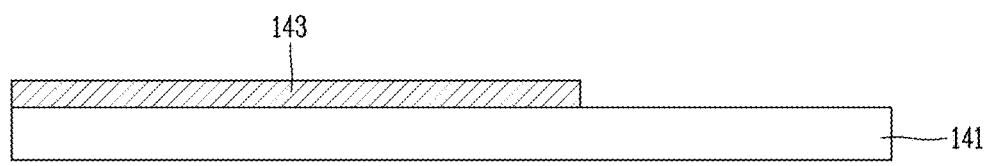
Figure 6O:
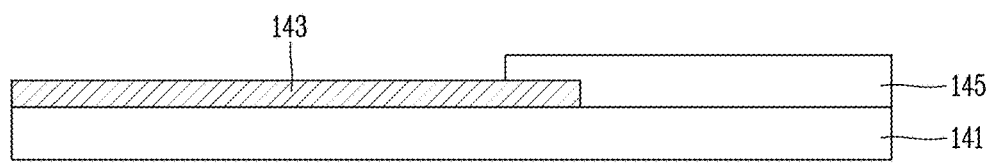
Figure 6P:
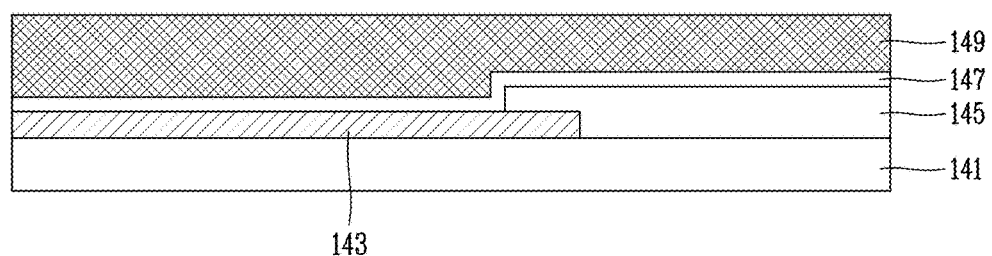
Figure 6Q:
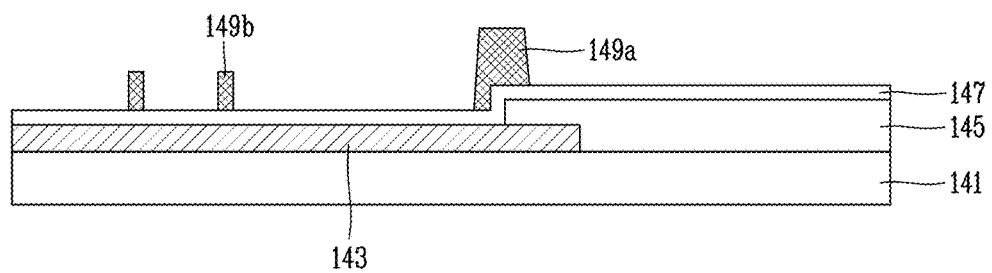
Figure 6R:
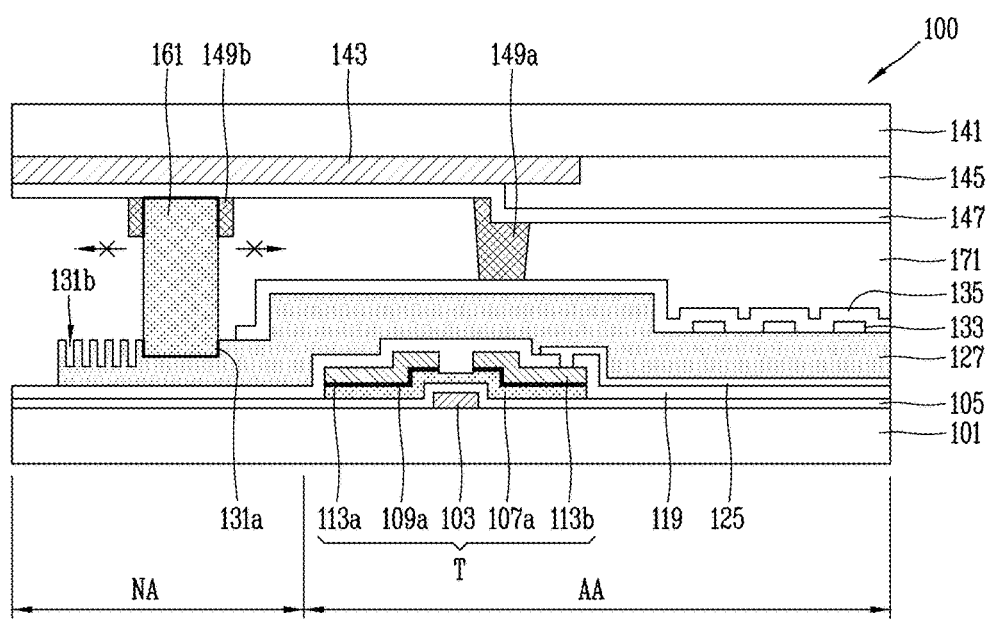

FIGS. 6A to 6R are sectional views sequentially showing a fabricating process of an FFS mode LCD device in accordance with an exemplary embodiment of the present disclosure.

Although not shown, a plurality of pixel regions including switching regions may be defined on a transparent lower substrate 101, and a first metal layer (not shown) may be deposited on the lower substrate 101 in a sputtering manner. Here, the first metal layer may be made of at least one selected from a conductive metal group consisting of aluminum (Al), tungsten (W), copper (Cu), molybdenum (Mo), chrome (Cr), titanium (Ti), molytungsten (MoW), molytitanium (MoTi), and copper/molytitanium (Cu/MoTi).

Afterwards, referring to FIG. 6A, the first metal layer may be selectively patterned by exposure and development using a mask (not shown), forming a gate line (not shown) and a gate electrode 103 extending from the gate line. Here, upon forming the gate line, although not shown, a gate pad (not shown) and a data pad (not shown) may also be formed at the same time.

Referring to FIG. 6B, a gate insulating layer 105 made of silicon nitride (SiNx) or silicon oxide (SiO$_2$) may be deposited on an entire surface of the lower substrate 101 including the gate electrode 103. An amorphous silicon layer (a-Si:H) 107, an amorphous silicon layer (n+ or p+) 109 containing impurities and a second metal layer 113 may be deposited on the gate insulating layer 105 in a sequential manner.

Here, the amorphous silicon layer (a-Si:H) 107 and the amorphous silicon layer (n+ or p+) 109 containing impurities may be deposited by a chemical vapor deposition (CVD) method, and the second metal layer 113 may be deposited by a sputtering method.

This exemplary embodiment exemplarily illustrates the CVD and the sputtering as the deposition method, but other deposition methods may also be employed if necessary.

The second metal layer 113 may be made of at least one selected from a conductive metal group consisting of aluminum (Al), tungsten (W), copper (Cu), molybdenum (Mo), chrome (Cr), titanium (Ti), molytungsten (MoW), molytitanium (MoTi), and copper/molytitanium (Cu/MoTi).

Referring to FIG. 6C, a photoresist with high transparency may be coated on the second metal layer 113 to form a photosensitive film 115.

Afterwards, the photosensitive film 115 may undergo an exposure process using a first diffraction mask 117 which may include a light blocking part 117a, a semi-transparent part 117b and a transparent part 117c.

Here, the light blocking part 117a of the diffraction mask 117 may be located above the photosensitive film 115 which overlaps an area for forming a data line, a source electrode and a drain electrode. The semi-transparent part 117b of the first diffraction mask 117 may be located above the photosensitive film 115 corresponding to a channel formation area of a TFT. Instead of using the first diffraction mask 117, a mask using a light diffraction effect, for example, a half-ton mask or other types of diffraction masks may alternatively be used.

Referring to FIG. 6D, after the exposure process, a development process may be carried out to etch the photosensitive film 115, forming a first pattern part 115a corresponding to the formation area of the data line and the source and drain electrodes and a second pattern part 115b corresponding to the channel formation area.

Here, since the first pattern part 115a is not transparent (light-transmittable), the first pattern part 115a may maintain the thickness of the photosensitive film 115. However, since light is partially transmitted through the second pattern part 115b, the second pattern part 115b may be removed by a predetermined thickness. That is, the second pattern part 115b may be thinner than the first pattern part 115a.

Referring to FIG. 6E, the second metal layer 113, the impurities-contained amorphous silicon layer 109 and the amorphous silicon layer 107 may be sequentially patterned using the first pattern part 115a and the second pattern part 115b as masks. Accordingly, a data line (not shown) perpendicularly intersecting with the gate line may be formed, and an active layer pattern 107a and an Ohmic contact layer pattern 109a may also be formed on the gate insulating layer 105 corresponding to the gate electrode 103.

Referring to FIG. 6F, an ashing process may be carried out to partially remove the first pattern part 115a corresponding to the formation area for the source and drain electrodes by a predetermined thickness and fully remove the second pattern part 115b corresponding to the channel formation area. Here, an upper surface of the second metal layer 113 which overlaps an upper side of the channel area may be exposed to the outside.

Referring to FIG. 6G, the exposed portion of the second metal layer 113 may be etched by using the first pattern part 115a, which has been partially etched by the predetermined thickness, as an etching mask, forming the source electrode 113a and the drain electrode 113b spaced apart from each other. Here, a portion of the Ohmic contact layer pattern 115a which is located on the channel area may be exposed to the outside.

An additional etching process may be carried out to etch the Ohmic contact layer 109a, which is exposed between the source electrode 113a and the drain electrode 113b, such that the source electrode 113a and the drain electrode 113b can be spaced from each other. Here, a channel may be formed at the active channel 107a located beneath the etched Ohmic contact layer 109a.

Referring to FIG. 6H, after fully removing the first pattern part 115a of the photosensitive film, an inorganic insulating material or an organic insulating material may be deposited on an entire surface of the lower substrate 101 to form a passivation layer 119. A photoresist with high transparency may be deposited on the passivation layer 119 to form a second photosensitive film 121.

Referring to FIG. 6I, the second photosensitive film may be etched by sequentially carrying out an exposure process and a development process through a photolithography using an exposure mask (not shown), thereby forming a second photosensitive film pattern 121a.

The passivation layer 119 and the lower gate insulating layer 105 may be sequentially etched by using the second photosensitive film pattern 121a as an etching mask, forming a drain contact hole 123 for exposing the drain electrode 113b therethrough. Upon forming the drain contact hole 123, although not shown, a gate pad contact hole (not shown) for exposing the gate pad and a data pad contact hole (not shown) for exposing the data pad may also be formed at the same time.

Although not shown, the second photosensitive film pattern 121a may be removed and a first transparent conductive material layer (not shown) may be deposited on the passivation layer 119 including the drain contact hole 123 through DC magnetron sputtering. Here, the first transparent conductive material layer may be made of one selected from a transparent material group consisting of indium tin oxide (ITO) and indium zinc oxide (IZO).

Afterwards, although not shown, a photoresist with high transparency may be coated on the first transparent conductive material layer to form a third photosensitive film (not shown).

Although not shown, an exposure process and a development process may be carried out through a photolithography using an exposure mask (not shown) to remove the third photosensitive film, thereby forming a third photosensitive film pattern (not shown).

Referring to FIG. 6J, the first transparent conductive material layer may be etched using the third photosensitive film pattern as an etching mask, forming a large pixel electrode 125, which is electrically connected to the drain electrode 113b via the drain contact hole 123.

Although not shown, the third photosensitive film pattern may be removed and the planarization layer 127 made of an organic insulating material may be formed on the passivation layer 119 including the pixel electrode 125. Here, the planarization layer 127 may be made of an insulating material, for example, one selected from inorganic insulating materials including silicon oxide ($SiO_2$) and silicon nitride (SiNx) or one selected from organic insulating materials including photoacryl having photosensitivity. The exemplary embodiment disclosed herein illustrates that the planarization layer 127 is formed of the organic insulating material having the photosensitivity.

Next, the exposure process may be carried out for the planarization layer 127 using a second diffraction mask 129 including a light blocking part 129a and a semi-transparent part 129b.

Here, the light blocking part 129a of the second diffraction mask 129 may be located above the planarization layer 127 of the display region AA having the plurality of pixel regions, and the semi-transparent part 129b of the second diffraction mask 129 may be located above the planarization layer 127 corresponding to a seal pattern insertion groove formation area in which a seal pattern is inserted and an anti-spreading groove formation area. Instead of using the second diffraction mask 127, a mask using a light diffraction effect, for example, a half-ton mask or other types of diffraction masks may alternatively be used.

Referring to FIG. 6L, after an exposure process is carried out using the second diffraction mask 129, a development process may be carried out to remove the exposed portion of the planarization layer 127, thereby forming a seal pattern insertion groove 131a and an anti-spreading groove 131b on the planarization layer 127. Here, the seal pattern insertion groove 131a in which a seal pattern 161 is inserted may be formed at a portion of a planarization layer 127, which is located on the non-display region NA of the lower substrate 101. The anti-spreading groove 131b may be formed on the planarization layer 127 adjacent to the seal pattern insertion groove 131a. Here, the anti-spreading groove 131b may be smaller than the seal pattern insertion groove 131a. The anti-spreading groove 131b may be provided in plurality. The seal pattern insertion groove 131a and the anti-spreading grooves 131b may also be formed on a passivation layer 119 other than the planarization layer 127.

Accordingly, with the seal pattern 161 being fixed by being inserted in the seal pattern insertion groove 131a, the seal pattern 161 may be primarily prevented from being spread to outer and inner sides of the non-display region NA. Also, the plurality of anti-spreading grooves 131b may function to secondarily prevent the seal pattern 161 or a lower alignment layer 135 from being spread out of the non-display region NA.

Afterwards, although not shown, a second transparent conductive material layer (not shown) may be deposited on the planarization layer 127 by DC magnetron sputtering. Here, the second transparent conductive material layer may be made of one selected from a transparent material group consisting of indium tin oxide (ITO) and indium zinc oxide (IZO).

Then, although not shown, a photoresist with high transparency may be deposited on the second transparent conductive material layer to form a fourth photosensitive film (not shown).

Although not shown, an exposure process and a development process may be carried out through a photolithography using an exposure mask (not shown) to remove the fourth photosensitive film, thereby forming a fourth photosensitive film pattern (not shown).

Referring to FIG. 6M, the second transparent conductive material layer may be etched using the fourth photosensitive film pattern as an etching mask, forming a plurality of diverged common electrodes 133 corresponding to the large pixel electrodes 125.

Afterwards, a lower alignment layer 135 may be formed on an entire surface of the planarization layer 127 including the plurality of common electrodes 133. Accordingly, a TFT array substrate fabrication process for the FFS mode LCD device according to the present disclosure may be completed.

Meanwhile, referring to FIG. 6N, a black matrix 143 may be formed on the upper substrate 141 which is bonded to the lower substrate 101 in a spaced state. The black matrix 143 may block light transmission into regions except for the pixel regions.

Referring to FIG. 6O, a color filter layer 145 including red, green and blue color filters may be formed on the pixel regions of the upper substrate 141. The black matrix 143 may be located on the color filter substrate 141 between the red, green and blue color filter layers 145.

The black matrix 143 may be disposed to overlap regions except for the pixel regions of the lower substrate 101, for example, the non-display region NA, the TFT T, the gate line and the data line upon bonding the upper substrate 141 and the lower substrate 101 to each other.

Next, an upper alignment layer 147 for aligning liquid crystal molecules in a predetermined orientation may be formed on the upper substrate 141 having the color filter layer 145, thereby completely executing a color filter array substrate fabrication process.

Referring to FIG. 6P, a photosensitive material layer 149 may be coated on the upper alignment layer 147.

Then, an exposure process may be carried out for the photosensitive material layer 149 using a third diffraction mask 151 including a light blocking part 151a, a semi-transparent part 151b and a transparent part 151c. Here, the light blocking part 151a of the third diffraction mask 151 may be located above the photosensitive material layer 149 corresponding to a column spacer formation area, and the semi-transparent part 151b may be located above the photosensitive material layer 149 corresponding to a partition wall formation area for fixing the seal pattern.

Instead of using the third diffraction mask 151, a mask using a light diffraction effect, for example, a half-ton mask or other types of diffraction masks may alternatively be used. Also, since the photosensitive material layer 149 has a photosensitive property, a separate material layer such as a photoresist may not have to be formed.

Referring to FIG. 6Q, after carrying out an exposure process using the third diffraction mask 151, a development process may be carried out to remove the exposed portion of the photosensitive material layer 149, thereby forming a column spacer 149a and partition walls 149b, in which a seal pattern 161 (see FIG. 6R). Here, the partition walls 149b may be provided by two at inner and outer sides, and the seal pattern 161 (see FIG. 6R) may be inserted between the inner and outer partition walls 149b. A space formed between the partition walls 149b may be greater than the seal pattern insertion groove 131a. The column spacer 149a and the partition walls 149b may be made of the same material.

Specifically, the partition walls 149b may include a first partition wall and a second partition wall, and be formed on the non-display region NA. The first partition wall may be located between the outermost portion of the non-display area NA and the seal pattern 161, and the second seal pattern 161 may be located between the seal pattern 161 and the column spacer 149a. A gap between the first partition wall and the second partition wall may be the same as a width of the seal pattern insertion groove 131a.

Accordingly, the seal pattern 161 which is formed through the following process may be located in the space formed between the partition walls 149b, so as to be prevented from being spread to the outer or inner side of the non-display region NA.

Afterwards, referring to FIG. 6R, for bonding the lower substrate 101 and the upper substrate 141, the seal pattern 161 may be formed between the seal pattern insertion groove 131a and the partition walls 149b located on the non-display regions NA of the lower substrate 101 and the upper substrate 141.

Finally, a liquid crystal layer 171 may be formed between the lower substrate 101 and the upper substrate 141, completing the fabrication of the FFS mode LCD device 100 according to the present disclosure.

Therefore, an LCD device according to the present disclosure may include a seal pattern insertion groove on an edge portion of a planarization layer located on a non-display region of a lower substrate, and partition walls formed on an upper substrate to define a space corresponding to the seal pattern insertion groove. This may allow the seal pattern to be fixed with being inserted in the seal pattern insertion groove and the space formed by the partition walls, resulting in reducing a margin for a spread width of the seal pattern and preventing the seal pattern or an alignment layer from being spread out of a cell.

Also, according to the LCD device and the fabricating method thereof according to the present disclosure, with further forming a plurality of anti-spreading grooves on the planarization layer at an outer side of the lower substrate adjacent to the seal pattern insertion groove, outward spreading of a part of the seal pattern or the alignment layer can be fully prevented.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of fabricating a liquid crystal display device comprising:
    providing a lower substrate and an upper substrate having a display region and a non-display region defined thereon;
    forming a gate line on the lower substrate in one direction and a data line intersecting with the gate line to define a pixel region, respectively;
    forming a thin film transistor on the intersection between the gate line and the data line;
    forming a pixel electrode on the pixel region of the lower substrate, the pixel electrode being electrically connected to the thin film transistor;
    forming a planarization layer having a seal pattern insertion groove and a plurality of anti-spreading grooves adjacent the seal pattern insertion groove on the non-display region of the lower substrate having the pixel electrode and the thin film transistor, the plurality of anti-spreading grooves are parallel to the seal pattern insertion groove on a side of the seal pattern insertion groove away from the display region;

forming a black matrix on the upper substrate;

forming a color filter layer on the upper substrate between the adjacent black matrixes;

forming partition walls and a column spacer on the upper substrate, the partition walls forming a space corresponding to the seal pattern insertion groove formed on the lower substrate;

forming a seal pattern between the seal pattern insertion groove of the lower substrate and the partition walls of the upper substrate; and forming a liquid crystal layer between the lower substrate and the upper substrate.

2. The method of claim 1, wherein the anti-spreading grooves and the seal pattern insertion groove are formed simultaneously.

3. The method of claim 1, wherein the anti-spreading grooves and the seal pattern insertion groove are formed by a masking process using a diffraction mask.

4. The method of claim 1, wherein the anti-spreading grooves are smaller than the seal pattern insertion groove.

5. The method of claim 4, wherein the anti-spreading grooves are plural.

6. The method of claim 1, wherein the planarization layer is made of an organic insulating material having photosensitivity and an inorganic insulating material.

7. The method of claim 1, wherein the partition walls are formed by a masking process using a diffraction mask.

8. The method of claim 1, wherein the partition walls and the column spacer are made of the same material.

9. The method of claim 1, wherein the partition walls comprise a first partition wall and a second partition wall formed on the non-display region.

10. The method of claim 9, wherein the first partition wall is located between the outermost portion of the non-display region and the seal pattern.

11. The method of claim 10, wherein the second partition wall is located between the seal pattern and the column spacer.

12. The method of claim 9, wherein a distance between the first partition wall and the second partition wall is the same as a width of the seal pattern insertion groove.

* * * * *